United States Patent
Zheng et al.

(10) Patent No.: US 11,405,192 B2
(45) Date of Patent: Aug. 2, 2022

(54) SEARCHABLE SYMMETRIC ENCRYPTION SYSTEM AND METHOD OF PROCESSING INVERTED INDEX

(71) Applicants: Robert Bosch GmbH, Stuttgart (DE); Qingji Zheng, Pittsburgh, PA (US); Xinxin Fan, Pittsburgh, PA (US); Jorge Guajardo Merchan, Pittsburgh, PA (US)

(72) Inventors: Qingji Zheng, Pittsburgh, PA (US); Xinxin Fan, Pittsburgh, PA (US); Jorge Guajardo Merchan, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 632 days.

(21) Appl. No.: 16/327,374

(22) PCT Filed: Aug. 24, 2017

(86) PCT No.: PCT/US2017/048472
§ 371 (c)(1),
(2) Date: Feb. 22, 2019

(87) PCT Pub. No.: WO2018/039481
PCT Pub. Date: Mar. 1, 2018

(65) Prior Publication Data
US 2019/0190709 A1 Jun. 20, 2019

Related U.S. Application Data

(60) Provisional application No. 62/378,942, filed on Aug. 24, 2016.

(51) Int. Cl.
*H04L 9/32* (2006.01)
*H04L 9/08* (2006.01)
(Continued)

(52) U.S. Cl.
CPC ...... *H04L 9/0861* (2013.01); *G06F 16/90335* (2019.01); *G06F 21/6245* (2013.01); *H04L 9/0891* (2013.01)

(58) Field of Classification Search
CPC ............. H04L 9/0861; H04L 9/0891; G06F 16/90335; G06F 21/6245
(Continued)

(56) References Cited

U.S. PATENT DOCUMENTS

2009/0116645 A1* 5/2009 Jeong ................... H04L 9/00
380/259
2009/0300351 A1* 12/2009 Lei ...................... G06F 16/951
713/165
(Continued)

OTHER PUBLICATIONS

Christoph Bosch; Distributed Searchable Symmetric Encryption; IEEE: 2014; p. 330-337.*
(Continued)

*Primary Examiner* — Monjur Rahim
(74) *Attorney, Agent, or Firm* — Maginot, Moore & Beck LLP

(57) ABSTRACT

A searchable symmetric encryption (SSE) system and method of processing inverted index is provided. The SSE system includes genKey, buildSecureIndex, genToken, and search operations. A compress X is integrated into at least one of the buildSecureIndex and search operations. The compress then X takes each entry of an encrypted index, compresses entry of the encrypted index into a compressed entry, and then processes the compressed entry with a function. The function comprises a linked list function and on array function. The search operation decompresses the processed entry and output the decompressed entry. The SSE comprises a client device and a server. The genKey, buildSecureIndex, and genToken operations are integrated into (Continued)

the client device and the search operation is integrated into the server.

10 Claims, 2 Drawing Sheets

(51) Int. Cl.
*G06F 21/62* (2013.01)
*G06F 16/903* (2019.01)

(58) Field of Classification Search
USPC .......................................................... 713/171
See application file for complete search history.

(56) References Cited

U.S. PATENT DOCUMENTS

| | | | | |
|---|---|---|---|---|
| 2011/0145594 A1* | 6/2011 | Jho | ....................... | G06F 21/602 713/189 |
| 2012/0078914 A1* | 3/2012 | Roeder | .................. | H04L 9/008 707/741 |
| 2013/0046974 A1* | 2/2013 | Kamara | ................... | H04L 9/00 713/165 |
| 2013/0262852 A1* | 10/2013 | Roeder | ................. | G06F 21/602 713/150 |
| 2013/0262863 A1* | 10/2013 | Yoshino | ................. | H04L 9/008 713/165 |
| 2013/0332729 A1* | 12/2013 | Ito | .......................... | H04L 9/002 713/165 |
| 2014/0032926 A1* | 1/2014 | Prem | ........................ | H04L 9/14 713/189 |
| 2015/0039903 A1* | 2/2015 | Cash | ..................... | G06F 16/951 713/189 |
| 2015/0143112 A1* | 5/2015 | Yavuz | ...................... | H04L 9/00 713/165 |
| 2016/0125198 A1* | 5/2016 | Hahn | .................. | G06F 21/6227 713/165 |
| 2017/0235969 A1* | 8/2017 | Kamara | ............. | H04L 63/0807 713/159 |
| 2019/0087432 A1* | 3/2019 | Sion | ....................... | G06F 21/62 |

OTHER PUBLICATIONS

International Search Report and Written Opinion corresponding to PCT Application No. PCT/US2017/048472, dated Dec. 8, 2017 (English language document) (12 pages).

* cited by examiner

SEARCHABLE SYMMETRIC ENCRYPTION SYSTEM AND METHOD OF PROCESSING INVERTED INDEX

CROSS-REFERENCE TO RELATED APPLICATIONS

This application is a 35 U.S.C. § 371 National Stage Application of PCT/US2017/048472, filed on Aug. 24, 2017, which claims the benefit of U.S. Provisional Application No. 62/378,942, filed on Aug. 24, 2016, the disclosures of which are herein incorporated by reference in their entirety.

FIELD

This disclosure relates generally to searchable encryption and, more particularly, to a searchable symmetric encryption (SSE) system and method of processing inverted index.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure related to a searchable symmetric encryption (SSE) system and method of processing inverted index. For example, the SSE system includes genKey, buildSecureIndex, genToken, and search operations. A compress X is integrated into at least one of the buildSecureIndex and search operations. The compress then X takes each entry of an encrypted index, compresses entry of the encrypted index into a compressed entry, and then processes the compressed entry with a function. The function comprises a linked list function and an array function. The search operation decompresses the processed entry and output the decompressed entry. The SSE comprises a client device and a server. The genKey, buildSecureIndex, and genToken operations are integrated into the client device and the search operation is integrated into the server.

According to another aspect of the disclosure, a client-server system comprises a server, a client device including an encrypted key for searching an encrypted file, and a computer readable medium coupled to the client device, wherein the client device is configured to search the encrypted file stored in the computer readable medium using the encrypted key. The client device further comprising a second input key, wherein the second input key is a file identifier, a keyword, and an inverted index. The client device is configured to search the encrypted file stored in the computer readable medium using the encrypted key with one of the identifier, the keyword, or inverted index. The computer readable medium is integrated into the server or a cloud network.

According to another aspect of the disclosure, a method of searching an encrypted files stored remotely, performed by a client device, the method comprising generating a genKey comprising a search index and an cryptographic key, generating a buildSecureIndex comprising an encryption key and a plaintext index, generating a token, and assembling the plaintext index. The plaintext index comprising at least one distinct keyword and a list of document identifiers, each document identifier having an entry, the entry including at least one element. The element of the entry is assigned to a randomly selected unit of pre-allocated array. The method further comprises connecting the select unit to another select unit using an indicator, wherein the select unit and another select unit are generated from the same entry.

BRIEF DESCRIPTION OF THE DRAWINGS

These and other features, aspects, and advantages of this disclosure will become better understood when the following detailed description of certain exemplary embodiments is read with reference to the accompanying drawings in which like characters represent like arts throughout the drawings, wherein.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

Figure 1:
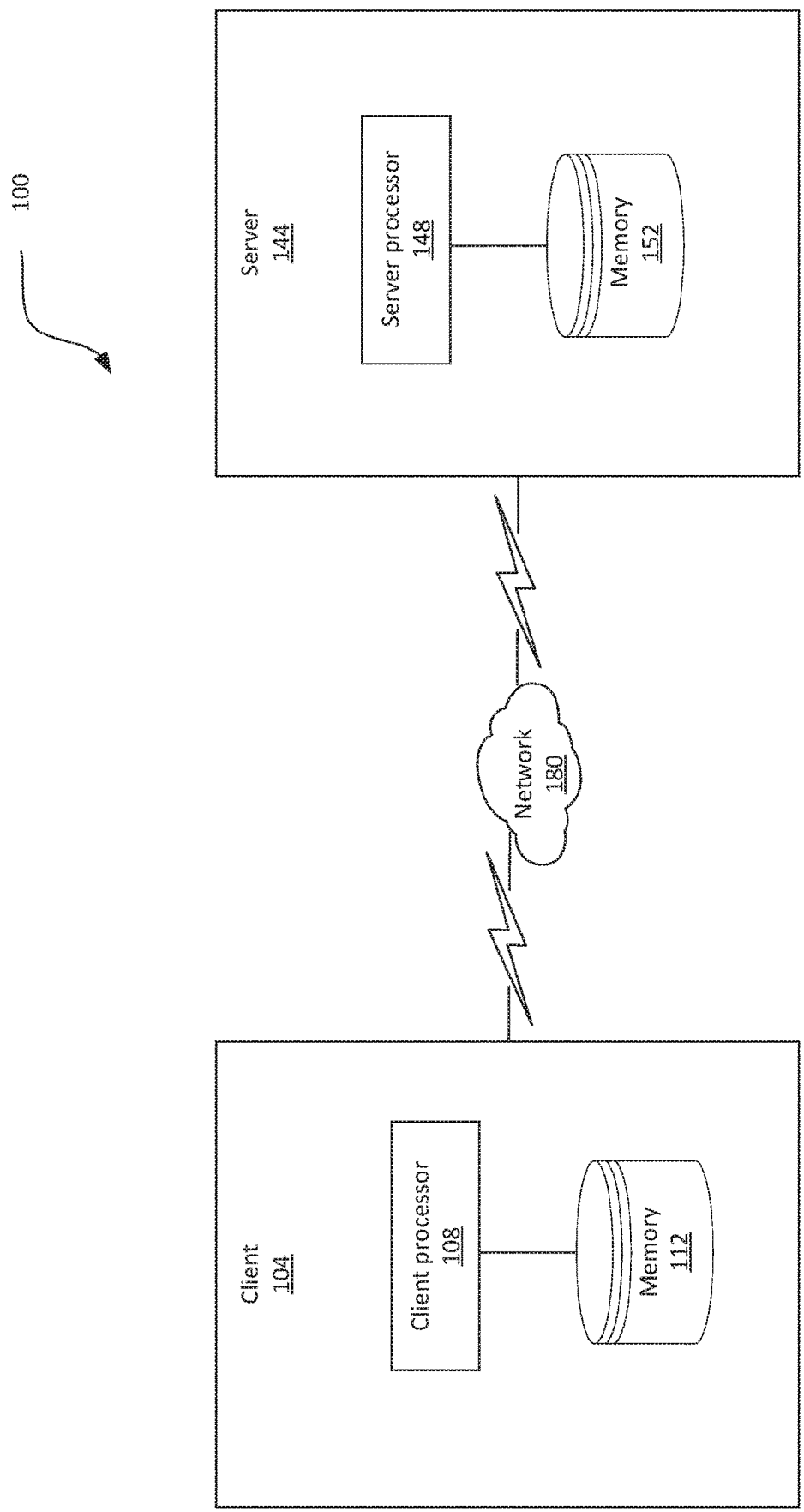
FIG. 1 is a block diagram of an a high-level architecture that implements a searchable symmetric encryption (SSE) in accordance to a described embodiment of the disclosure.

FIG. 1 depicts a client-server system 100 that implements a searchable symmetric encryption (SSE) system to enable a client computing device (client) 104 to search encrypted files that are stored in a memory of a server 144. SSE system allows the client 104 to outsource the data in the encrypted form to the server 144, i.e. a third-party service provider or a network 180, i.e. a cloud network while the client 104 retains an encryption key. For example, encryption takes a plaintext such as a file identifier and the encryption key as input. In some embodiments, the client 104 takes a keyword and the encryption key as input and provides a search token for the keyword. In another embodiment, the search token is provided to the client 104 of the third-party service provider 144 with a search query, and the client 104 uses the search token to receive a set of encrypted documents stored on the third-party service provider 144 that are responsive to the underlying keyword. The third-party service provider 144 returns all encrypted documents without learning any information about keywords and the documents. Searchable encryption can secure outsourcing of data by retaining the encrypted key at the client 104. In one embodiment, the encrypted key stored in the memory 112 of the client device 104. Depending on the application, an inverted index based SSE system is provided to search the encrypted data. For example, an index is populated with each search token and the returned encrypted data. In some embodiments, when a keyword is searched again, the index can be used to search in constant time. In other words, the search token corresponding to the keyword can be used as an input to the index to retrieve the encrypted data.

The system 100 includes the client 104, the server 144, and a network 180, such as a local area network (LAN), wide area network (WAN) cellular network, the Internet, a telephone network, a cloud network, or other suitable data network that enables communication between the client 104 and server 144. The client 104 includes a client processor 108 and a memory 112. The processor 108 is a microprocessor or other digital logic device that executes stored program instructions and the memory 112 includes both volatile data storage devices such as random access memory (RAM) and non-volatile data storage devices such as magnetic disks and solid state drives. Some embodiments of the client processor 108 include parallel execution hardware that incorporates multiple processing cores or other parallel processing components to perform file encryption and decryption, search term encryption, file update operations, and other operations that are implemented as part of a DSSE scheme concurrently. Examples of client computing devices include portable and desktop personal computers (PCs), smartphones, tablet computing devices, wearable computing devices, thick clients, thin clients, and any other suitable digital computing device.

The server 144 includes a server processor 148 and a memory 152. The processor 148 in the server 144 is a microprocessor or other digital logic device that executes stored program instructions to perform searches and file storage and retrieval services for the client 104. The server 144 may be optionally integrated into the network 180. In some embodiments, one or more servers may be communicatively coupled to the client computing device 104 over the network 180. While not a requirement, in some embodiments the server processor 148 has greater computational power than the client processor 108. Some embodiments of the server processor 148 include parallel execution hardware that incorporates multiple processing cores or other parallel processing components to perform searches and other operations that are implemented as part of a SSE system concurrently. The memory 152 in the server 144 includes both volatile data storage devices such as random access memory (RAM) and non-volatile data storage devices such as magnetic disks and solid state drives. While not a requirement, in some embodiments the server memory 152 has a larger capacity than the client memory 112 to enable the server memory 152 to store a large number of encrypted files. While FIG. 1 depicts a single client 104 for illustrative purposes, in many embodiments the server 144 stores encrypted data for multiple client computing devices. Each client computing device generates an encrypted data, sends the encrypted data to the server 144 over the network 180 for storage. The encrypted data is then stored in the server memory 152.

In the system 100, the client 104 communicates with the server 144 through the network 180. Both the client 108 and server 144 include network communication devices, such as wired network devices (e.g. Ethernet or other suitable wired network interface) and wireless network devices (e.g. Bluetooth or IEEE 802.11 wireless LAN and 3G, 4G, LTE wireless WAN or any cellular wireless protocol WAN). In the discussion below, the client 104 and server 144 are assumed to communicate using authenticated and encrypted communication processes that are known to the art and are not described in further detail herein. Thus, an eavesdropping computing device that monitors traffic through the network 180 cannot determine the contents of communications between the client 104 and server 144. An "attacker" refers to a computing device or entity that has access to the server 144 and/or the network 180 and has the ability to read at least portions of the data stored in the server memory 152 and/or the network 180 such as a third-party service provider in a manner that is not approved by the client 104. The attacker has a goal of extracting information about an encrypted client files stored in the server memory 152 and/or the network 180 to reduce or eliminate the privacy of the content of these files. The attacker also observes the contents of the encrypted search and data that are generated during operations in the server 144 to generate information about the encrypted files. The attacker is also presumed to have the ability to monitor network communications at the server 144 and/or the network 180 to circumvent the encryption of communication messages between the client 104 and the server 144. While the attacker can observe communications from the client 104, the attacker does not have direct access to the contents of the client memory 112, the server 144, nor the network 180.

Figure 2:
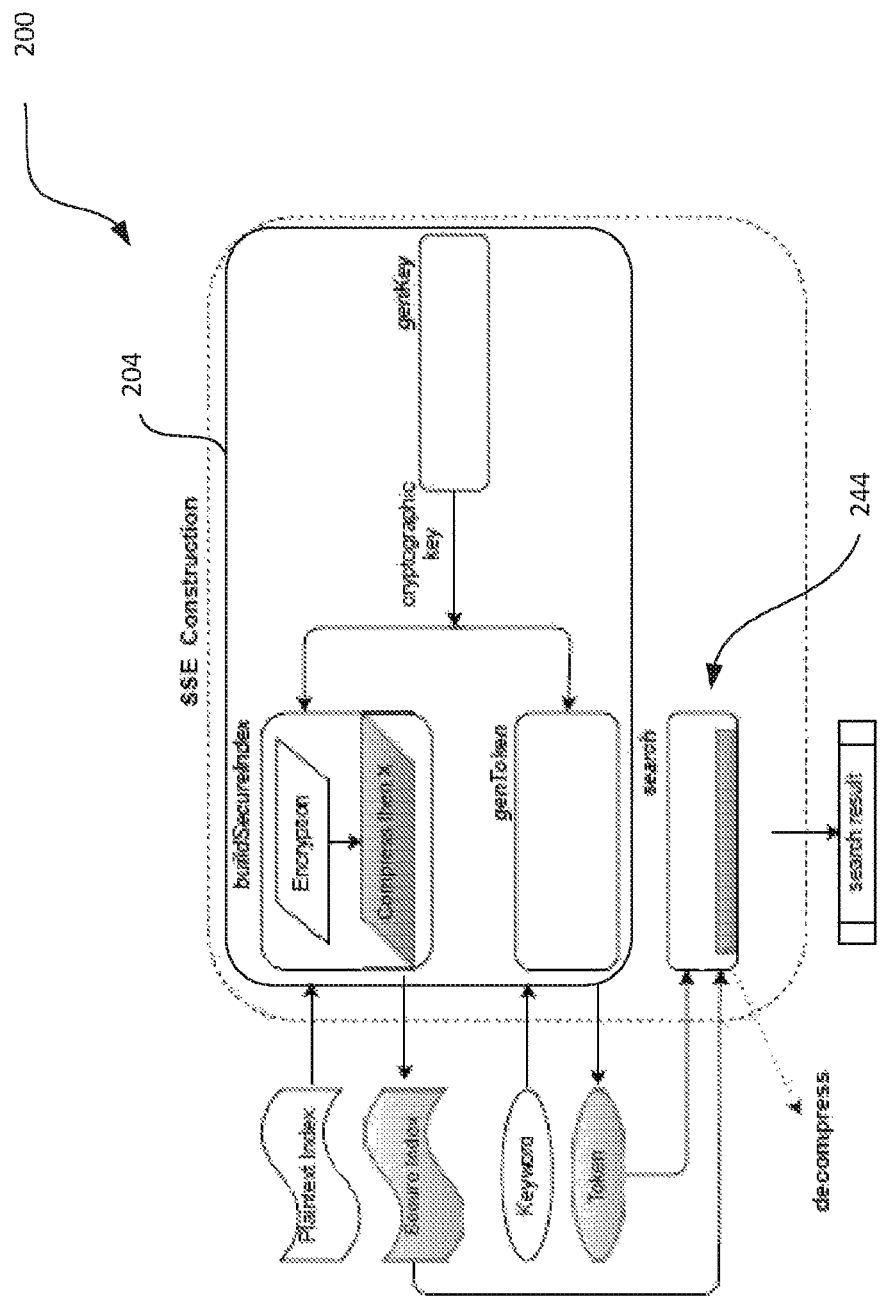
FIG. 2 is a block diagram of the SSE system in accordance to an exemplary embodiment of the disclosure.

FIG. 2 illustrates a block diagram of a SSE system 100 in accordance to an exemplary embodiment of the disclosure. The SSE system 100 includes four operations: genKey, buildSecureIndex, genToken, and search. Depending on the applications, other suitable operations may be included in the SSE system. The first three operations are run on a client device 204 and the latter is run on a cloud server 244, i.e. a third-party service provider. Gen is an operation to generate a search index and search key, genKey is a cryptographic key generation operation, buildSecureIndex is a build secure index generation operation, genToken is a token generation operation, and search is a search operation. Within the buildSecureIndex, an encryption operation and an assemble operation are included. The encryption operation takes a plaintext index and encrypted key, i.e. cryptographic key to produce an encrypted data for protecting the index privacy. The assembly operation assembles the plaintext index to protect statistical information such as keyword frequency, etc. Depending on the application, the order of the encryption operation and the assembly operation may be random. In other words, either operation may come first.

For example, an input plaintext index to the assemble operation is represented as:

$$DB=\{DB(w_1), \ldots, DB(w_n)\}$$

$$DB(w_i)=\{F_{i1}, \ldots, F_{ic}\}$$

where $w_1, \ldots, w_n$ are distinct keywords, DB(w) is the list of document identifiers $F_{ij}$ containing the keyword w, $DB(w_i)$ is an entry to DB for $1 \leq i \leq n$ and $F_{ij}$ is the document identifier of $DB(w_i)$ for $1 \leq j \leq c$.

To implement the assembly operation, linked list function or array function may be used that are known to the art. The linked list function assigns each element of the entries in DB to a randomly selected unit of a pre-allocated array and links the selected unit through an indicator if the respective elements belong to the same entry. For example, given $DB=\{DB(w_1), \ldots, DB(w_n)\}$ comprises of n entries and $$N = \sum_{i=1}^{N} |DB(w_i)|$$

elements, i.e. document identifiers in total, the client device 204 pre-allocates an array of size N, puts each element to a unit of the array size N, and connects those units with indicators if the elements belong to the same entry. In other words, the unit in the array will store two values, i.e. first value is the element of the entry which is a document identifier in DB(w) and the second value is either the indicator indicating the value of next unit that belongs to the same entry or NULL indicator if there is no more elements associating the same entry. The array function maps each entry of DB to an array of a designated length and then concatenates those arrays together in any order, i.e. random order. The designated length is usually set to the size of the entry that has a maximum number of the elements for the security reason without leaking structure or statistic information to the cloud server 244. For example, given DB={DB($w_1$), . . . , DB($w_n$)} where L=$\max_{i=1}^{n}$|DB($w_i$)| is the maximum size of the entry in DB, the client device 204 assigns each entry DB(w) to an array of L by filling non-occupied units with "padding" strings and then concatenates those arrays together.

An exemplary compress then X scheme is implemented in the assemble operation of the SSE system 200. X is defined as either a linked list function or an array function. The compress then X scheme compresses each entry of the index DB into a compressed entry and then processes the compressed entry with either the linked list function or the array function in the buildSecureIndex. In turn, the search operation decompresses the processed entry. For example, let LCA=(compress, decompress) be any lossless compression coding operation, such as Arithmetic coding operation or Huffman coding operation, where compress compresses the binary string into the compressed string and the decompress recovers the compressed string to an uncompressed string. As introduced above, the buildSecureIndex is a build secure index generation operation. For each entry of DB, the buildSecureIndex concatenates all elements into a string $str_i = F_{i1} \| \ldots \| F_{ic}$, assuming the entry has c elements as an example. The lossless compression coding operation LCA. compress is applied to on the string $str_i$ and a compressed string $str'_i$ is generated. The buildSecureIndex then divides $str'_i$ into equal length segments $str'_i = str'_{i1} \| \ldots \| str'_{iz}$ such that $str'_{ij}$, $1 \leq j \leq z$, has the same length as that of the document identifier, i.e., $|str'_{ij}| = |F_{ij}|$. After the entry of DB is processed, the compress then X scheme applies either the linked list function or the array function to the resulting compressed string $str'_i$. Upon query, the search retrieves the compressed string $str'_i$, decompresses compressed string $str'_i$ to $str_i$ using LCA.decompress. As can be seen, compress then X scheme not only improves input and output efficiency, the compress then X scheme minimizes the storage overhead. As a result, the reduction of the number of disk access when retrieving any number of entry has been improved.

The embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling with the sprit and scope of this disclosure.

Embodiments within the scope of the disclosure may also include non-transitory computer-readable storage media or machine-readable medium for carrying or having computer-executable instructions or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the patent has been described with reference to various embodiments, it will be understood that these embodiments are illustrative and that the scope of the disclosure is not limited to them. Many variations, modifications, additions, and improvements are possible. More generally, embodiments in accordance with the patent have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A client-server system comprising:
    a server configured to store, in a storage device, (i) encrypted files and (ii) a secure index for the encrypted files in a storage device; and
    a client device configured to generate the secure index using an assembly operation and a cryptographic key, the secure index having a plurality of entries, the assembly operation including compressing each respective entry of the secure index and then processing each respective entry of the secure index with a linked list function or an array function,
    wherein the client device is configured to search the encrypted file stored at the server.

2. The client-server system of claim 1, wherein the client device generates the secure index based on a plaintext index and the cryptographic key.

3. The client-server system of claim 1, wherein:
    the client device is configured to search the encrypted file stored at the server by (i) generating a token based on a keyword using the cryptographic key, and (ii) transmitting the token to the server; and
    the server is configured to retrieve at least one encrypted file based on the token using the secure index.

4. The client-server system of claim 1, wherein the compressing of the assembly operation is performed using a lossless compression.

5. The client-server system of claim 1, wherein the linked list function assigns each respective element of entries of a plaintext index to a randomly selected unit of a pre-allocated array and links the selected unit to another unit of the array through an indicator if the respective elements belong to a same entry of the plaintext index.

6. The client-server system of claim 1, wherein the array function maps each entry of a plaintext index to a respective array of a designated length and concatenates the respective arrays together in a random order.

7. A method of searching encrypted files stored at a remote server, the method comprising:
   receiving, with a client device, a plaintext index having a plurality of entries, each entry corresponding to a distinct keyword and including a list of document identifiers for files containing the distinct keyword;
   generating, with the client device, a cryptographic key;
   generating, with the client device, a secure index, based on the plaintext index, using an assembly operation and the cryptographic key, the secure index having a plurality of entries, the assembly operation including compressing each respective entry of the secure index and then processing each respective entry of the secure index with a linked list function or an array function;
   receiving, with the client device, a keyword;
   generating, with the client device, a token based on the received keyword using the cryptographic key; and
   retrieving, from a server, at least one encrypted file based on the token using the secure index.

8. The method of claim 7, wherein the compressing of the assembly operation is performed using a lossless compression.

9. The method of claim 7, wherein the linked list function includes:
   assigning each respective element of the entries of the plaintext index to a randomly selected unit of a pre-allocated array; and
   linking the selected unit to another unit of the array through an indicator if the respective elements belong to a same entry of the plaintext index.

10. The method of claim 7, wherein the array function includes:
    mapping each entry of a plaintext index to a respective array of a designated length; and
    concatenating the respective arrays together in a random order.

* * * * *